H. COLL.
Steam Siphon Pumps.

No. 154,223.  Patented Aug. 18, 1874.

WITNESSES
Frederick Standish
E. C. Fitler.

INVENTOR
Hugh Coll
by Bakewell & Kerr
Attorneys

UNITED STATES PATENT OFFICE.

HUGH COLL, OF MILLVALE BOROUGH, PENNSYLVANIA.

IMPROVEMENT IN STEAM SIPHON-PUMPS.

Specification forming part of Letters Patent No. 154,223, dated August 18, 1874; application filed February 7, 1874.

CASE 1.

*To all whom it may concern:*

Be it known that I, HUGH COLL, of Millvale Borough, in the county of Allegheny and State of Pennsylvania, have invented a new and useful Improvement in Method of Increasing the Operative Power of Steam Siphon-Pumps; and I do hereby declare the following to be a full, clear, and exact description thereof, reference being had to the accompanying drawing, forming a part of this specification, in which—

Figure 1:
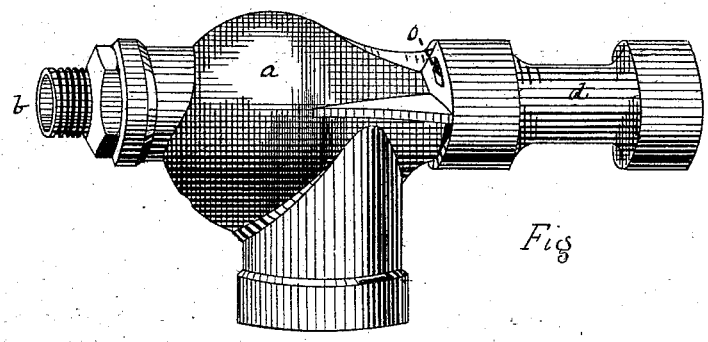
Figure 2:
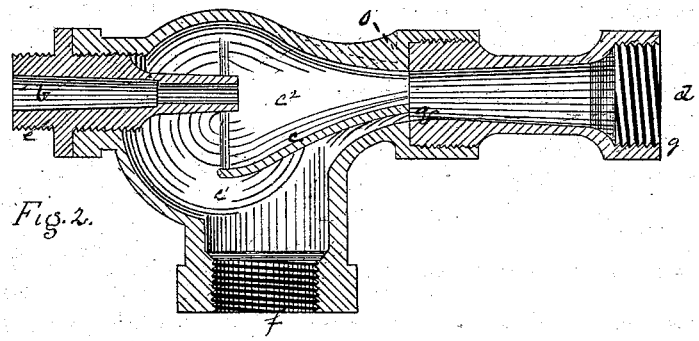
Figure 3:
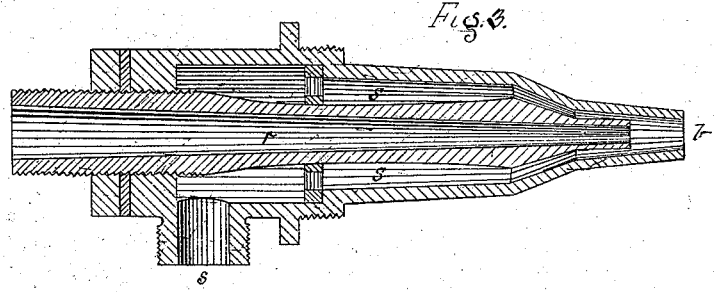

Figure 1 is a perspective view of a steam siphon-pump which is adapted for the practicing of my invention. Fig. 2 is a longitudinal section. Fig. 3 is a view of a steam-nozzle.

Like letters of reference indicate like parts in each.

My invention consists in a method of utilizing atmospheric pressure in steam siphon-pumps. This I do by an opening or openings in the pump, at a point in the rear of the discharge-point, through which the pressure may act in a line parallel or converging to the line of the direction of the current. In siphon-pumps of this class the pressure of the atmosphere at the discharge-nozzle is an ever-present force that must be overcome before a current can be established or sustained. It is evident that this necessitates the expenditure of a large amount of pressure.

For the purpose of embodying my invention into a practical and operative form, I have constructed the apparatus shown in the drawings, which I will now proceed to describe in order to enable others skilled in the art to make and use it.

The pump shown has a head, $a$, a steam-nozzle, $b$, a diaphragm, $c$, extending across the chamber and dividing it into a receiving part, and a discharge part, $e^1$ and $e^2$. It also has a discharge-nozzle, $d$, and is fitted with threads $e$, $f$, and $g$, for the purpose of making the necessary connections, being thus far the same that was patented by me October 21, 1873. Extending through the head $a$, and entering the nozzle $d$, I make one or more air ports or openings, $o$. The openings may extend in from various points at various angles, but must enter the discharge-nozzle at a line convergent to the line of the direction of the current. These openings permit the pressure of the atmosphere to operate against the column of water in that direction. This pressure, operating as described, in connection with the steam, increases the power of the pump very greatly. To provide for the admission of water to accommodate the increased power in this pump over one of corresponding size of the form at present in use, an opening, $q$, is made at the forward end of the diaphragm, to allow the water from the receiving-chamber to pass directly into the discharge-nozzle. The power of the pump is sufficient to drive the full column of water from the discharge-chamber, and at the same time a column of water through the opening $q$.

Fig. 3 illustrates a method of applying the atmospheric pressure in the steam-nozzle. The steam may be admitted through either of the connections $r$ or $s$, while the other is the passage through which the pressure of the atmosphere acts. I prefer, however, to admit the steam through the passage $s$, so that it shall envelop the air admitted through the passage $r$, in order to prevent the latter from escaping into the discharge-chamber and getting back of the mouth of the jet-pipe. This cannot happen where the air operates through openings in the discharge-nozzle, but may when acting through an opening in the steam-jet.

What I claim as my invention, and desire to secure by Letters Patent, is—

A steam siphon-pump having ports or openings entering in a line parallel or convergent to the direction of its discharge, at a point in the rear of its discharge-point, through which the pressure of the atmosphere may act, as described.

In testimony whereof I, the said HUGH COLL, have hereunto set my hand.

HUGH COLL.

Witnesses:
FREDERICK STANDISH,
T. B. KERR.